United States Patent [19]
Yahya et al.

[11] Patent Number: 5,217,626
[45] Date of Patent: Jun. 8, 1993

[54] WATER DISINFECTION SYSTEM AND METHOD

[75] Inventors: Moyasar T. Yahya; Charles P. Gerba, both of Tucson, Ariz.

[73] Assignee: Research Corporation Technologies, Inc., Tucson, Ariz.

[21] Appl. No.: 705,830

[22] Filed: May 28, 1991

[51] Int. Cl.$^5$ .............................................. C02F 1/50
[52] U.S. Cl. .................................. 210/764; 210/916; 422/28; 252/175; 252/176; 424/618; 424/630; 424/640
[58] Field of Search ............... 210/758, 759, 764, 916, 210/748, 243, 169; 422/28; 252/175, 176, 178; 424/618, 630, 640, 632, 637; 204/149, 152, 293

[56] References Cited

U.S. PATENT DOCUMENTS
4,492,618  1/1985  Eder.
4,680,114  7/1987  Hayes.

OTHER PUBLICATIONS

Yahya, M. T., Landeen, L. K., Kutz, S. M., Gerba, C. P., "Swimming Pool Disinfection, An Evaluatin of the Efficacy of Copper; Silver Ions", *Journal of Environmental Health*, vol. 51, No.5, pp. 282-285 (1989).

Yahya, M. T., Landeen, L. K., Kutz, S. M., Gerba, C. P., "Inactivation of *Legionella Pneumophila* by Exposure to Copper: Silver Ions and Reduced Levels of Free Chlorine", Microbial Aspects of Surface Water Quality, Water Pollution Control Federation Specialty Conference Series: pp. 82-95 (May 30-Jun. 2, 1989).

Thurman, R. B. and Gerba, C. P., "The Molecular Mechanisms of Copper and Silver Ion Disinfection of Bacteria and Viruses", *CRC Critical Review in Environmental Control*, vol. 18, Issue 4, pp. 295-315 (1989).

Landeen, L. K., Yahya, M. T., Kutz, S. M., Gerba, C. P., "Microbiological Evaluation of Copper: Silver Disinfection Units for use in Swimming Pools", *Wat. Sci. Tech.*, vol. 21, No. 3, pp. 267-270 (1989).

Yahya, M. T., Landeen, L. K., Forsthoefel, N. R., Kujawa, K. and Gerba, C. P., "Evaluation of Potassium Permanganate for Inactivation of Bacteriophage MS-2 in Water Systems", *J. Env. Science and Health*, vol. 24, No. 8, pp. 979-989, (1989).

Yahya, M. T., Landeen, L. K. and Gerba, C. P., "Inactivation of *Legionella Pneumophila* by Potassium Permanganate", *Env. Tech.*, vol. 11, pp. 657-662 (1990).

Landeen, L. K., Yahya, M. T. and Gerba, C. P., "Efficacy of Copper and Silver Ions and Reduced Levels of Free Chlorine in Inactivation of *Legionella Pneumophila*", *Applied and Environmental Microbiology*, vol. 55, No. 12, pp. 3045-3050 (Dec. 1989).

Primary Examiner—Stanley S. Silverman
Assistant Examiner—Neil M. McCarthy
Attorney, Agent, or Firm—Scully, Scott, Murphy & Presser

[57] ABSTRACT

A water disinfection system is disclosed. The system comprises a permanganate in a concentration of up to about 15 mg/L, copper ions in a concentration of up to about 900 μg/L, and silver ions in a concentration of up to about 90 μg/L. In addition, a method for disinfecting water utilizing this system is described.

41 Claims, 1 Drawing Sheet

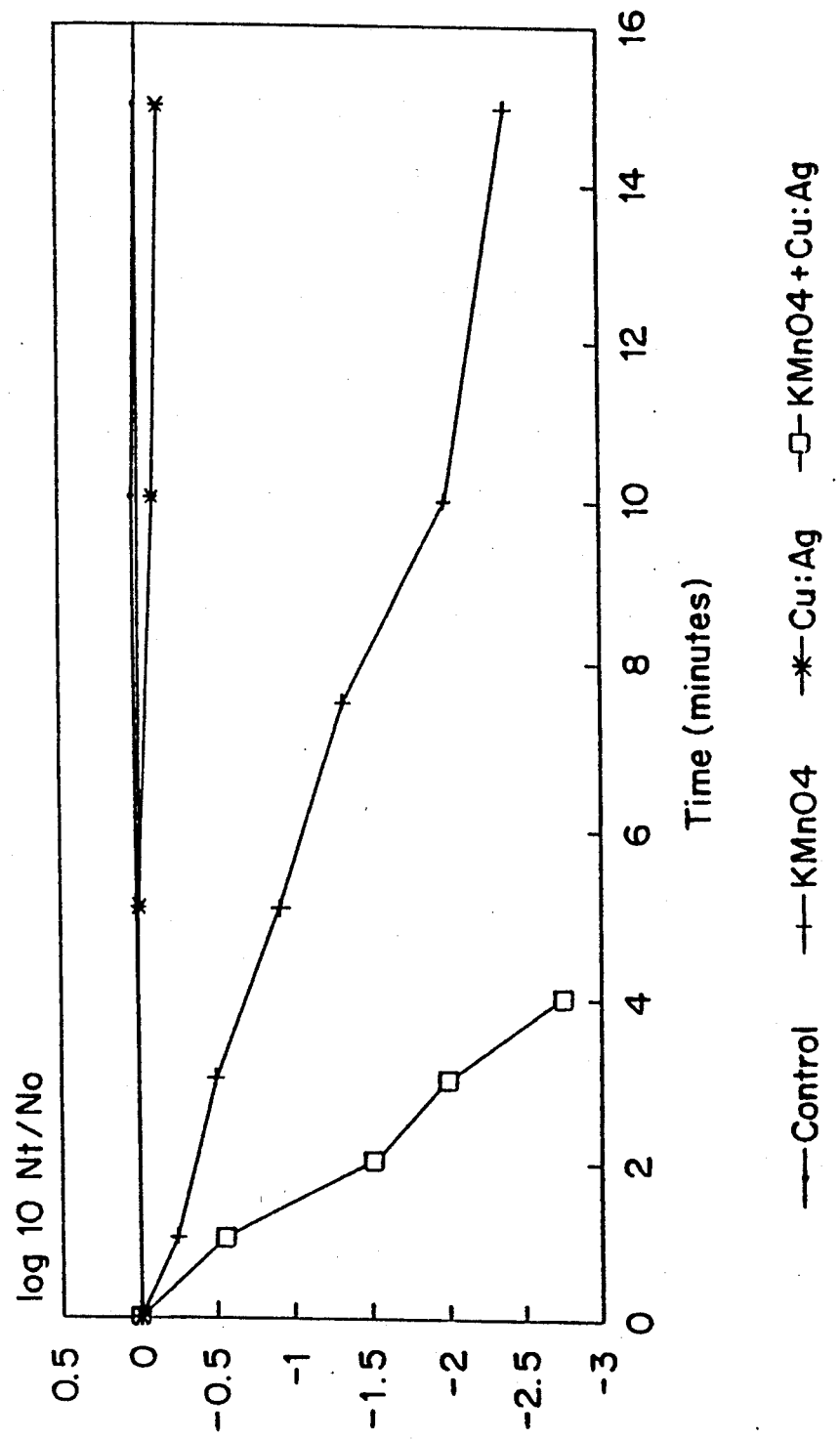

WATER DISINFECTION SYSTEM AND METHOD

BACKGROUND OF THE DISCLOSURE

1. Field of the Invention

The present invention is directed to a disinfection system for the inactivation of microorganisms such as bacteria, viruses, fungi, parasites, etc., in water. More particularly, the present invention is directed to a disinfection system of a permanganate, and copper and silver ions. This system provides a high level of reduction in the number of microorganisms in a reduced period of time, as well as a high rate of inactivation. The present invention is further directed to a method of disinfecting water using the system of the present invention.

2. Background of the Prior Art

Because of its importance and ubiquity of application, methods for the disinfection of water have received long-term and widespread attention. Disinfection, as used in this specification, refers to the destruction or irreversible inactivation of infectious or other undesirable microorganisms such as bacteria, pathogenic fungi, parasites, viruses and the like. Various techniques for water disinfection have been developed to render affected water potable or simply less odiferous.

Generally, the more practical techniques involve the addition of a disinfecting agent to the water. Agents commonly used in this regard include halogens, oxidants other than halogen, and metals, either in free or salt form.

Of the halogens, chlorine is the most widely used. Chlorine may be added to water in any number of ways, such as direct addition of elementary chlorine or by addition of chlorine-containing compounds, including calcium hypochlorite, sodium hypochlorite, chlorine dioxide or chloramines. It is believed that the disinfecting action of chlorine gas, the hypochlorites and the chloramines is due primarily to the release of hypochlorous acid [HOCl) as well as the likely contributory effect of the hypochlorite ion (OCl$^-$) As to chlorine dioxide, it is believed that the disinfecting action is attributable to chlorite (ClO$^-_2$) and/or chlorate (ClO$^-_3$) ions.

Despite its popularity, chlorination suffers from several drawbacks. For example, chlorine gas, the hypochlorites and the chloramines lose much of their potency under practical conditions of disinfection, such as when organic matter is present, owing to the intense reactivity of both the hypochlorous acid and the hypochlorite ion. Further, the chloramines are generally much less effective than hypochlorous acid: they require more time and higher concentrations to achieve effective disinfection. The use of chlorine dioxide also has disadvantages which are primarily health related in that it is believed the residual by-products, i.e., the chlorite and chlorate ions, have adverse physiological effects. Indeed, chlorination has been found to contribute to the formation of numerous chlorinated organic compounds in water. These compounds, e.g., trihalomethanes, are known or suspected to be hazardous to human health Other oxidants, separate and apart from the halogens, have also been investigated to determine their efficacy as regards water disinfection. Most prominent among these are ozone and the permanganates, especially potassium permanganate. Ozone is an active disinfectant in the presence of water and has been used mainly in connection with the disinfection of water in swimming pools. However, ozone has a very high oxidation potential which results in the ability of the water to carry any residual that is present. Further, ozone is more expensive to employ than other, more readily available disinfectants, such as chlorine-based agents.

Potassium permanganate in water has been used for the removal and control of iron and manganese in surface water supplies, as well as for the removal of odors caused by organic matter and microbial growth. In addition, because of its broad microbial properties, potassium permanganate has been used for the disinfection of drinking water. This particular use, however, has fallen out of favor since potassium permanganate produces a residue, i.e., manganese dioxide, as an oxidation by-product, which residue is toxic and generally requires removal during conventional water treatment practices of flocculation, sedimentation and filtration.

To mitigate the deleterious effects attendent the use of chlorine-based compounds or potassium permanganate at the concentrations required for the separate use of these materials, systems combining these two disinfectants have been investigated. For example, Yahya, et al. in the *Journal of Environmental Science and Health*, Vol. 24, No. 8 (1989) envisage the use of potassium permanganate as an adjunct to chlorination, allowing the amount of chlorine to be reduced while still maintaining the requisite inactivation of viruses.

Other methods of disinfecting water include the use of metals, either in free form or salt form. Metals most often used for this purpose include copper and silver which have a long history in this regard, the preservation of water by storage in silver or copper vessels being known to the Persians. Current methods usually require the generation of copper and/or silver ions, generally by electrolytic means. For example, U.S. Pat. No. 4,680,114 to Hayes relates a water purification apparatus especially useful for swimming pools. The apparatus is comprised of electrodes formed with copper and silver; electric current causes copper and silver ions to pass into solution, thus destroying bacteria, algae and other microorganisms.

Thurman and Gerba, *CRC Critical Reviews in Environmental Control*, Vol. 18, No. 5, Pages 295-315 (1989) examine the possible mechanisms responsible for the disinfecting properties that copper and silver have on bacteria and viruses.

While halogens, oxidants other than halogens and metals have been used individually for disinfection purposes, various combinations of these have also been investigated. Examples of these attempts include U.S. Pat. No. 4,492,618 to Eder, which relates a method for disinfecting swimming pool water using copper and silver ions in conjunction with sodium persulfate. The sodium persulfate is described as releasing oxygen when under the influence of copper and silver ions, thus causing the oxidation of organic substances.

Studies have also been performed using combinations of copper and silver ions with free chlorine to reduce bacterial numbers in water environments. For example, the *Journal of Environmental Health*, Vol. 51, No. 5, Pages 282-285 (1989) reports the use of copper and silver ions in combination with 0.2 milligrams per liter (mg/L) of free chlorine; the *Water Pollution Control Federation Specialty Conference Series*, Page 85 et seq. May 29-June 2, 1989 relates the use of copper and silver ions in combination with 0.1-0.4 mg/L of free chlorine, and *Water Science and Technology*, Vol. 21, No. 3, Pages 267-270 (1989) describes anti-microbial activity for a combination of copper and silver ions with and without low levels (0.2-0.3 mg/L) of free chlorine.

However, given the health concerns involved in the use of chlorine and chlorine-based disinfectants, these methods are less than desirable for most practical applications.

Thus the water disinfection art recognizes a continuing need to find disinfection systems and methods that are effective, economical, have high levels and rates of inactivation, and are easy to implement and do not pose the threat to human health or the environment that currently attend known practices.

SUMMARY OF THE INVENTION

A new water disinfection system and method has now been developed which exhibits improved levels of inactivation of bacteria, viruses, fungi and parasites in water systems such as drinking water, cooling towers and swimming pools. In addition, this new system and method is economical and does not present the carcinogenic and environmental threat known to exist in the disinfection methods of the prior art.

In accordance with the present invention, a disinfection system for water is provided The system comprises a permanganate in a concentration of up to about 15 mg/L; copper ions in a concentration of up to about 900 micrograms per liter ($\mu g/L$); and silver ions in a concentration of up to about 90 $\mu g/L$.

In further accordance with the subject invention, a method for disinfecting water, comprising the above-defined system, is provided.

The system of the present invention can reduce by at least ten-fold the time required for a 99.9% (3 $\log_{10}$) reduction in the numbers of, e.g., Coliphage MS-2, compared to a copper ion-silver ion system alone, or by at least five-fold compared to potassium permanganate alone. The present invention also manifests a significantly higher in-activation rate than previously known methods.

BRIEF DESCRIPTION OF THE DRAWINGS

FIG. 1 graphically depicts the inactivation of Coliphage MS-2 over time when practicing an embodiment of the present invention utilizing 5 mg/L of potassium permanganate with 400 $\mu g/L$ of copper ions and 40 $\mu g/L$ of silver ions, as compared to a control system and systems utilizing, separately, 5 mg/L of potassium permanganate, and copper ions and silver ions having concentrations of 400 $\mu g/L$ and 40 $\mu g/L$, respectively.

DETAILED DESCRIPTION OF THE INVENTION

The water disinfection system of the present invention comprises a permanganate, preferably potassium permanganate ($KMnO_4$), although other permanganates and mixtures thereof may be used, in a concentration of up to about 15 mg/L, in combination with copper ions present in a concentration of up to about 900 $\mu g/L$, and silver ions present in a concentration of up to about 90 $\mu g/L$.

Although no particular minimum amounts for each of the permangante, copper ions and silver ions are necessary in practice of the present invention, it is preferred if at least about 1 mg/L of permangante, at least about 50 $\mu g/L$ of copper ions and at least about 5 $\mu g/L$ of silver ions is utilized.

Thus in a preferred aspect of the present invention, the concentration of permanganate is about 1 to about 10 mg/L; the concentration of copper ions is about 50 to about 800 $\mu g/L$, and the concentration of silver ions is about 5 to 90 $\mu g/L$. More preferably, the concentration of permanganate is about 2 to about 8 mg/L; the concentration of copper ions is about 100 to about 800 $\mu g/L$, and the concentration of silver ions is about 10 to about 70 $\mu g/L$. Even more preferably, the concentration of permanganate is about 3 to about 7 mg/L; the concentration of copper ions is about 200 to about 600 $\mu g/L$, and the concentration of silver ions is about 20 to about 60 $\mu g/L$. Still more preferably, the concentration of permanganate is about 4 to about 6 mg/L; the concentration of copper ions is about 300 to about 500 $\mu g/L$, and the concentration of silver ions is about 30 to about 50 $\mu g/L$. Most preferably, the concentration of permanganate is about 5 mg/L; the concentration of copper ions is about 400 $\mu g/L$, and the concentration of silver ions is about 40 $\mu g/L$.

The copper ions and silver ions may be generated in any number of ways known to the art. For example, the copper and silver ions may be generated electrolytically, such as, for example, by the use of pure copper and silver electrodes or by commercially available generating units such as the Electronic Pool Purity Unit, model UTP2 (Tarn-Pure USA; Las Vegas, NV). Concurrently or alternatively thereto, copper ions and silver ions can be generated by employing any water-soluble copper compounds and any water-soluble silver compounds either individually or in combinations. Examples of water-soluble copper compounds in this regard include copper sulfate and copper chloride. Examples of water-soluble silver compounds in this regard include silver nitrate and silver chloride. The utilization of water-soluble copper and water-soluble silver compounds is desirable to the extent the water disinfection system of the present inventon may be conveniently packaged and easily contacted with the affected body of water by, e.g., dispersion or by incorporating the disinfection system in a filter in which contact occurs, without the need for electrolytic generation of copper and silver ions. Copper and silver concentrations can be ascertained by, for example, using an Atomic Absorption Spectrophotometer (such as the commercially available Hitachi 180-70, halow cathode lamp) and standard solutions of silver nitrate ($AgNO_3$) and cupric sulphate ($CuSo_4$), as described in the *Official Methods of Analysis* (AOAC, 1984).

The present invention is also directed to a method for disinfecting water which comprises contacting infected water with the system described above. Infection may be caused by any number of microorganisms including bacteria, viruses, fungi, parasites, and the like. Examples of such microorganisms include without limitation: *Escherichia coli, Streptococcus faecalis, Legionella pneumophila, Yersinia enterocolitica, Staphylococcus aureus, Pseudomonas aeruginosa, Klebsiella terrigena* and *Salmonella typhi.*

The following example is given to illustrate the scope of the present invention. Since the example is given for illustrative purposes only, the invention should not be limited thereto.

EXAMPLE

This example illustrates the efficacy of the present invention by investigating the inactivation of Coliphage MS-2 over the course of time, in four systems:

System 1 is a control system comprised of a phosphate buffer at pHs of 6.0 and 8.0.

System 2 is a comparative system comprised of a phosphate buffer, 400 µg/L of copper ions and 40 µg/L of silver ions.

System 3 is a comparative system comprised of a phosphate buffer and 5 mg/L of $KMnO_4$.

System 4 is a system formed in accordance with the present invention and comprises 5 mg/L $KMnO_4$, 400 µg/L of copper ions and 40 µg/L silver ions, all in a phosphate buffer.

Those skilled in the art will appreciate that the phosphate buffer is utilized in order to simulate the more extreme conditions of drinking water and to minimize fluctuations in the pH of the systems tested. A pH value of about 8.0 was chosen for this example as representative of the pH found in many of the drinking water supplies in the United States.

Inactivation as a function of time, and related inactivation rates, were determined for each of Systems 1-4 using Coliphage MS-2. MS-2 was used as a model for human viruses since it has a structure and size similar to many of the enteric viruses encountered in water environments. MS-2 also has a resistance that is generally equal to or greater than that of enteroviruses to the more commonplace water disinfectants.

All glassware used in this example was acid washed. The glassware was soaked in 10% nitric acid for at least 18 hours, followed by rinsing in distilled water to ensure the absence of organic contaminants. The glassware was then sterilized and soaked overnight in 0.5 to 1.0 mg/L free chlorine solution to achieve demand-free containers. The glassware was rinsed with distilled water prior to use.

The phosphate buffers used in Systems 1-4 were prepared with potassium phosphate monobasic (0.1M), adjusted to the desired pH of 6.0 or 8.0 using 0.1M NaOH, and then autoclaved at 121° C. for 15 minutes. The pH was check and readjusted if necessary, prior to employment in Systems 1-4. Experimentally, the efficacy of Systems 1-4 was determined in phosphate buffer at a pH of either 6.0 or 8.0 and a temperature of 7° C.

A stock solution (100 mg/L) of permanganate was prepared using potassium permanganate (commercially available from Carus Co., La Salle, IL). Standard solutions of $KMnO_4$ were prepared in phosphate buffer. The procedure that was utilized to determine the concentration of potassium permanganate was based upon the spectrophotometric technique described in the Official Methods of Analysis of the Association of Analytical Chemists, 1984. In this regard, a standard curve was generated by plotting the absorbance of serial dilutions (0-10 mg/L) of potassium permanganate in phosphate buffer at 545 nanometers (nm) using a Beckman DU-5 spectrophotometer (commercially available from Beckman, Irvine, CA) versus the concentrations and a correlation coefficient of at least 0.997. The absorbance data from the samples were then used to calculate the concentrations of potassium permanganate.

Copper and silver ions were produced electrolytically by applying an electric current between two copper and silver electrodes, in water, at a pH of 7.0. The proximate concentrations of copper and silver were monitored by a calorimetric method according to the *Standard Methods for the Analysis of Water and Wastewater* (APHA, 1986). (Commercially available copper test kits may also be used, such as the Copper Test Kit, Model EC-ZOR, LaMotte Chemical Products Company, Maryland, USA. To monitor the concentrations, silver nitrate and cupric sulfate were used to prepare silver and copper serial solutions. Standard curves were then generated for each metal by using atomic adsorption spectrophotometric techniques and by plotting concentration versus absorbance; linear regression equations were calculated from each standard curve. The absorbance data of these sample systems used in the present example were then used to calculate the corresponding concentration from the linear regression equation.

A pure culture of tested bacteria, such as an indicator bacteria, here *Escherichia Coli* ATCC 11229, was obtained from the American Type culture Collection (Rockville, MD) and lyophilized according to known techniques. The lyophized cultures were recovered in skim milk and grown on a non-selective medium (R2A medium, commercially obtained from Difco). Prior to investigating Systems 1-4, the bacterial culture was inoculated into tryptic soy broth and grown for 4-6 hours with continuous shaking at the optimum temperature of the tested bacteria. Bacterial cells obtained by centrifuging at 8,000 xg for 15 minutes, were washed twice in filtered well water. The final pellet was resuspended in filtered well water and standardized by comparison to McFarlin Solution No. 1 (a suspension of barium sulfate precipitate) to a cell density of $3 \times 10^8$ organisms per milliliter (mL).

Bacteriophage MS-2 was used in this Example as a T model for human enteric viruses. *Escherichia coli* (ATCC 15597) culture grown for 18-24 hours in tryptic soy broth was used to propagate Bacteriophage MS-2. Stock of MS-2 (ATCC 15597B) was serially diluted in tris buffer (Trizma base, pH 7.3) to an approximate concentration of 105 plaque forming units (pfu)/mL. To tubes of molten overlay agar (tryptic soy broth with 1% agar), 0.1 mL phage dilution and 10 mL *Escherichia coli* culture were added, mixed and poured onto tryptic soy agar plates. After 18-24 hours of incubation at 37° C., 6-7 mL of tris were added to plates with conluent plaque and left at room temperature for 1 hour to allow the phage to diffuse through the agar into the tris. The liquid fraction was recovered from the plates, centrifuged at 8,000 xg to remove the bacterial cell was and debris, and then centrifuged at 100,000 xg for 3 hours to pelletize the phage. The resultant pellet was resuspended in filtered well water and stored at 4° C. until use.

Purified stock culture of the bacteriophage and bacteria were added separately to Systems 1-4. At predetermined time intervals, 1.0 mL samples from Systems 1-4 were taken and mixed immediately with 10 microliters (µL) of a neutralizer solution (14.6% sodium thiosulfate and 10% sodium thioglycolate in distilled water and filtered through a 0.2 µm pore filter) to neutralize residual $KMnO_4$.

A bacterial assay was obtained from samples representing Systems 1-4. The samples were diluted in 0.1% sterile peptone; 0.1 mL of each of the diluted samples from Systems 1-4 was spread plated onto a non-selective medium (R2A medium, commercially obtained from Difco). The samples were incubated at the optimum temperature for the time required for complete growth of the colonies. The colonies were enumerated and the bacterial inactivation rate and $\log_{10}$ reduction were calculated for each of Systems 1-4.

An assay for Bacteriophage MS-2 was obtained from the samples taken from Systems 1–4 after making the appropriate dilution in sterile tris buffer. One tenth mL of the dilution for each sample was added to a test tube containing 3 mL of molten overlay agar and 1.0 mL of the *Escherichia coli* culture that was previously grown for 4–6 hours. The mixture was then poured onto tryptic soy agar plates. The plates were incubated at 37° C. for 18–24 hours, after which time the plaque obtained were enumerated and the inactivation rates and $\log_{10}$ reduction were calculated for each of Systems 1–4 using the following methods. Inactivation rates, k, $\log_{10}$ reduction per minute, were calculated using linear regression analyses and the equation $$k = -[(log_{10}C_t/log_{10}C_o)t]$$

wherein $C_o$ and $C_t$ were the initial ($C_o$) and the final ($C_t$) concentrations of the microorganism per 1 mL, and t was time in minutes. The k value represents the negative slope of the linear regression equation generated by plotting the $\log_{10}$ reduction in the number of microorganisms versus time in minutes. In the present instance, the k value was calculated as $\log_{10}$ reduction per minute.

The inactivation rates obtained for Systems 1–4 are listed in Table 1, below:

TABLE 1

| Inactivation of Coliphage MS-2 | |
|---|---|
| | k |
| | ($\log_{10}$ reduction/min.) |
| System 1 | 0.0023 |
| System 2 | 0.0131 |
| System 3 | 0.1774 |
| System 4 | 0.8863 |

As apparent, the inactivation rate for System 4, representing the practice of the present invention, is significantly higher than those for System 1, the control system, and Systems 2 and 3 representing, respectively, disinfection using a copper ion/silver ion system, and a KMnO₄ system.

The inactivation obtained is shown in FIG. 1 as numbers of coliphage in pfu/ml ($\log_{10}N_t/N_o$, wherein $N_t$ and $N_o$ are the final and initial numbers of coliphage) over time. As seen in FIG. 1, Systems 1 and 2 obtain a marginal decrease in the numbers of MS-2 over the course of 15 minutes, with System 3 performing somewhat better. In comparison, System 4, representing the practice of the present invention, obtains a dramatic reduction in the number of MS-2, that is, System 4 shows a reduction in the time required for a 99.9% (3 $\log_{10}$) reduction in the numbers of Coliphage MS-2 that is at least ten fold compared to System 2, and at least five fold compared to System 3.

The above example is given to illustrate the instant invention. This embodiment and example will make apparent to those in the art, other embodiments and examples. These other embodiments and examples are within the contemplation of the instant invention.

What is claimed is:

1. A disinfection system for water which comprises a permanganate present in a concentration of up to about 15 μg/L, copper ions present a concentration of up to about 900 μg/L, and silver ions present in a concentration of up to about 90 μg/L.

2. The disinfection system of claim 1 wherein said permanganate is potassium permanganate.

3. The disinfection system of claim 1 wherein the concentration of said permanganate is about 1 to about 10 mg/L, the concentration of said copper ions is about 50 to about 800 μg/L, and the concentration of said silver ions is about 5 to about 80 μg/L.

4. The disinfection system of claim 3 wherein the concentration of permanganate is about 2 to about 8 mg/L, the concentration of copper ions is about 100 to about 700 μg/L, and the concentration of silver ions is about 10 to about 70 μg/L.

5. The disinfection system of claim 4 wherein the concentration of permanganate is about 3 to about 7 mg/L, the concentration of copper ions is about 200 to about 600 μg/L, and the concentration of silver ions is about 20 to about 60 μg/L.

6. The disinfection system of claim 5 wherein the concentration of permanganate is about 4 to about 6 mg/L, the concentration of copper ions is about 300 to about 500 μg/L, and the concentration of silver ions is about 30 to about 50 μg/L.

7. The disinfection system of claim 6 wherein the concentration of permanganate is about 5 mg/L, the concentration of copper ions is about 400 μg/L, and the concentration of silver ions is about 40 μg/L.

8. The disinfection system of claim 1 wherein the copper ions are generated electrolytically.

9. The disinfection system of claim 1 wherein the silver ions are generated electrolytically.

10. The disinfection system of claim 1 wherein the copper ions are generated from a water-soluble copper compound.

11. The disinfection system of claim 10 wherein the water-soluble copper compound is copper sulfate, copper chloride or mixtures thereof.

12. The disinfection system of claim 10 wherein the silver ions are generated from a water-soluble silver compound.

13. The disinfection system of claim 12 wherein the water-soluble silver compound is silver nitrate, silver chloride or mixtures thereof.

14. The disinfection system of claim 1 wherein said permanganate, a water-soluble copper compound from which said copper ions are generated and a water-soluble silver compound from which said silver ions are generated are provided as a package.

15. The disinfection system of claim 14 wherein said permangante is potassium permanganate and said water-soluble copper compound is copper sulfate, copper chloride or mixtures thereof, and said water-soluble silver compound is silver nitrate, silver chloride or mixtures thereof.

16. A method for disinfecting water which comprises contacting infected water with a disinfection system comprising permanganate, copper ions, and silver ions, said permanganate present in a concentration of up to about 15 mg/L, said copper ions present in a concentration of up to about 900 μg/L, and said silver ions present in a concentration of up to about 90 μg/L.

17. The method of claim 16 wherein said permanganate is potassium permanganate.

18. The method of claim 16 wherein the concentration of permanganate is about 1 to about 10 mg/L, the concentration of copper ions is about 50 to about 800 μg/L, and the concentration, of silver ions is about 5 to about 80 μg/L.

19. The method of claim 18 wherein the concentration of permanganate is about 2 to about 8 mg/L, the concentration of copper ions is about 100 to about 700 μg/L, and the concentration of silver ions is about 10 to about 70 μg/L.

20. The method of claim 19 wherein the concentration of permanganate is about 3 to about 7 mg/L, the concentration of copper ions is about 200 to about 600 μg/L, and the concentration of silver ions is about 20 to about 60 μg/L.

21. The method of claim 20 wherein the concentration permanganate is about 4 to about 6 mg/L, the concentration of copper ions is about 300 to about 500 μg/L, and the concentration of silver ions is about 30 to about 50 μg/L.

22. The method of claim 21 wherein the concentration of permanganate is about 5 mg/L, the concentration of copper ions is about 400 μg/L, and the concentration of silver ions is about 40 μg/L.

23. The method of claim 16 wherein the copper ions are generated electrolytically.

24. The method of claim 16 wherein the silver ions are generated electrolytically.

25. The method of claim 16 wherein the copper ions are generated from a water-soluble copper compound.

26. The method of claim 25 wherein the water-soluble copper compound is copper sulfate, copper chloride or mixtures thereof.

27. The method of claim 16 wehrein the the silver ions are generated from a water-soluble silver compound.

28. The method of claim 27 wherein the water-soluble silver compound is silver nitrate, silver chloride or mixtures thereof.

29. The method of claim 16 wherein said contacting occurs in a filter.

30. The method of claim 16 wherein said infected water contains a microorganism.

31. The method of claim 30 wherein said microorganism is a bacterium, virus, fungus or parasite.

32. The method of claim 31 wherein said microorganism is *Escherichia coli, Streptococcus faecalis, Legimella pneumophila, Yersinia enterocolitica, Staphylococcus aureus, Pseudomonas aeruginosa Klebsiella terrigena* or *Salmonella typhi.*

33. The method of claim 31 wherein said bacteria is a coliphage.

34. The method of claim 33 wherein said coliphage is Coliphage MS-2.

35. A package useful for the disinfection of water which comprises a permanganate, a water-soluble copper compound from which copper ions are generated and a water-soluble silver compound from which silver ions are generated, said permanganate, said water-soluble copper compound and said water-soluble silver compound being present in amounts sufficient to provide a concentration of said permanganate of up to about 15 mg/L, a concentration of said copper ions of up to about 900 μg/L and a concentration of silver ions of up to about 90 μg/L.

36. The package of claim 35 wherein siad permanganate, said water-soluble copper compound and said water-soluble silver compound are present in amounts sufficient to provide a concentration of said permanganate of about 1 to about 10 g/L, a concentration of said copper ions of about 50 to about 800 μg/L and a concentration of silver ions of about 5 to about 8 μg/L.

37. The package of claim 36 wherein said permanganate, said water-soluble copper compound and said water-soluble silver compound are present in amounts sufficient to provide a concentration of said permanganate of about 2 to about 8 mg/L, a concentration of said copper ions of about 100 to about 700 μg/L and a concentration of silver ions of about 10 to about 70 μg/L.

38. The package of claim 37 wherein said permanganate, said water-soluble copper compound and said water-soluble silver compound are present in amounts sufficient to provide a concentration ofs aid permanganate of about 3 to about 7 mg/L, a concentration of said copper ions of about 200 to about 600 μg/L and a concentration of silver ions of about 20 to about 60 μg/L.

39. The package of claim 28 wherein said permanganate, said water-soluble copper compound and said water-soluble silver compound are present in amounts sufficient to provide a concentration of said permanganate of about 4 to about 6 mg/L, a concentration of said copper ions of about 300 to about 500 μg/L and a concentration of silver ions of about 30 to about 50 μg/L.

40. The package of claim 39 wherein said permanganate, said water-soluble copper compound and said water-soluble silver compound are present in amounts sufficient to provide a concentration of said permanganate of about 5 mg/L, a concentration of said copper ions of about 400 μg/L and a concentration of silver ions of about 40 μg/L.

41. The package of claim 35 wherein said permanganate is potassium permanganate, said water-soluble copper compound is copper sulfate, copper chloride or mixtures thereof, and said water-soluble silver compound is silver nitrate, silver chloride or mixtures thereof.

* * * * *

UNITED STATES PATENT AND TRADEMARK OFFICE
CERTIFICATE OF CORRECTION

PATENT NO. : 5,217,626

DATED : June 8, 1993

INVENTOR(S) : Moyasar T. Yahya, et al.

It is certified that error appears in the above-identified patent and that said Letters Patent is hereby corrected as shown below:

Column 6, line 30:  delete "T"

Column 7, line 66, Claim 1:  after "present" insert --in--

Column 9, line 29:  "wehrein the the" should read --wherein the--

Column 9, line 44, Claim 32:  after "aeruginosa" insert --,--

Column 10, line 14, Claim 36:  "g/L" should read --mg/L--

Column 10, line 27, Claim 38:  "ofs aid" should read --of said--

Signed and Sealed this

Eighteenth Day of January, 1994

*Attest:*

BRUCE LEHMAN

*Attesting Officer*    *Commissioner of Patents and Trademarks*